United States Patent [19]
Lin et al.

[11] Patent Number: 5,845,111
[45] Date of Patent: Dec. 1, 1998

[54] APPARATUS AND METHOD FOR SWITCHING AN OPERATING FREQUENCY OF A COMPUTER MOTHERBOARD

[75] Inventors: Wen-chung Lin; Chih-ping Huang; Hsan-yueh Fang, all of Taipei, Taiwan

[73] Assignee: ABIT Computer Corporation, Taipei, Taiwan

[21] Appl. No.: 742,629

[22] Filed: Nov. 1, 1996

[51] Int. Cl.$^6$ ...................................................... G06F 1/08
[52] U.S. Cl. ............................................................ 395/556
[58] Field of Search ................................... 395/556, 559

[56] References Cited

U.S. PATENT DOCUMENTS 4,020,425  4/1977  Hoffmann et al. ......................... 331/16
5,062,128  10/1991  Katsuragi et al. ......................... 377/55

Primary Examiner—Thomas M. Heckler
Attorney, Agent, or Firm—Kirkpatrick & Lockhart LLP

[57] ABSTRACT

An apparatus and method for switching the operating frequency of a computer host board by setting on a screen of the computer is disclosed. The apparatus and method use a frequency selection controller, instead of a switch or jumper selector used in a conventional apparatus and method, to control a frequency doubling factor required for the CPU and system chip set and a frequency selection signal output to a frequency generator. The switching operating frequency method is accomplished by manually activating the system to enable the system firmware to set a frequency doubling factor and an operating frequency when the system is powered up, outputting an address signal including the frequency and a frequency to be switched by a data/address bus after the system firmware sets the frequency doubling factor and the operating frequency, and decoding the address signal and locking the frequency data, whereby to change the frequency doubling factor output to the CPU and chip set and a frequency selection signal output to a frequency generator.

15 Claims, 3 Drawing Sheets

APPARATUS AND METHOD FOR SWITCHING AN OPERATING FREQUENCY OF A COMPUTER MOTHERBOARD

BACKGROUND OF THE INVENTION

1. Field of the Invention

The present invention relates to an apparatus and method for switching an operating frequency of a computer motherboard, in particular, to an apparatus and method for switching an operating frequency of a computer motherboard simply by directly setting on the screen of the computer, instead of by changing or adjusting the jumper after disassembling the computer.

2. Description of Related Art

Recently, the spectrum of operating frequencies of the central processing units (CPU) of various computers has been enhanced as the computer grades are improved progressively, for example, 75/90/100/110/120/133/150/166/180/200 MHz, etc., while various CPU with various operating frequencies are of various frequency multiplying factors. For the CPU, used in a PENTIUM equipped personal computer, the frequency multiplying factor is 1.5 for an operating frequency of 75/90/100 MHz, 2.0 for an operating frequency of 120/133 MHz and 3.0 for an operating frequency of 180/200 MHz. Furthermore, the PENTIUM CPU has various kinds of outer operating frequencies such as 50, 60 and 66 MHz. Also, for the CYRIX CPU of various grades, the frequency multiplying factors are 2.0, but their outer operating frequencies are different, such as 50, 55, 60, 66, 75 MHz. For the AMD CPUs of various grades which have a clock pulse similar to that of the PENTIUM CPUs, the outer operating frequencies thereof is from 50 to 60 MHz and the frequency multiplying factors are only from 1.5 to 2.0. Consequently, to support the above mentioned CPUs, the manufacturers have to provide a plurality sets of jumpers and switches on the computer motherboard within a computer for users to adjust said frequency multiplying factor and frequency selection signal. Referring to FIG. 2, there is shown a block diagram of said conventional apparatus for switching an operating frequency of a computer motherboard. The conventional apparatus uses a switch or jumper selector 12 for outputting a set of frequency multiplying signals 101 to the input pins BF0, BF1 of the CPU and system chip, and a frequency selection signal 102 to the input pins S0~S2 of the frequency generator 11. The frequency selection signal 102 is provided for determining the operating frequency 103 required for the CPU and system chip and output by the frequency generator 11. Then the CPU and system chip carry on a frequency multiplying process to the input operating frequency 103 according to the frequency multiplying factor signal 101. Therefore, when assembling the CPU, the frequency multiplying factor jumper varying from 1.5 to 3 and the outer operating frequency jumper varying from 50 Mhz to 66 MHz need to be adjusted.

It is understood that this kind of apparatus and method has several disadvantages. One is that a series of steps such as disassembling the computer, comparing with the handbook and adjusting the jumper are required when the operating frequency is desired to be adjusted. A second disadvantage is that using a jumper for selective skip connection may cause an error set. A third disadvantage is that the metal jumper may be aged and oxidized due to the humidity and may cause a defective contact. Therefore, there is a need for above apparatus and method to be improved.

The present invention provides an improved apparatus and method for switching the operating frequency of a computer motherboard to mitigate and/or obviate the aforementioned problems.

SUMMARY OF THE INVENTION

One object of the present invention is to provide an apparatus and method for switching an operating frequency of a computer motherboard by means of setting on the screen of the computer, instead of by changing or adjusting the jumper.

Another object of the present invention is to provide an apparatus and method for randomly adjusting the CPU operating frequency. When the resetting frequency is too high so that the computer can not be powered up, a resetting operation can be started on the screen simply by powering off and restarting the computer, without disassembling the computer and clearing the prior set.

In accordance with one aspect of the present invention, a method for switching an operating frequency of a computer host comprises the steps of manually activating a system to enable the system firmware to set a frequency multiplying factor and an operating frequency when the system is powered up; outputting an address signal including said frequency and a frequency to be switched by a data/address bus after the system firmware sets the frequency multiplying factor and the operating frequency; and decoding said address signal and latching said frequency data, thereby to change the frequency multiplying factor output to the CPU and chip set and a frequency selection signal output to a frequency generator.

In accordance with another aspect of the present invention, an apparatus for switching an operating frequency of a computer motherboard uses a frequency selection controller instead of a switch or jumper selector. The frequency selection controller comprises a storage unit for storing and latching the frequency data input by the bus to be changed, said storage unit having a first output connected with the CPU and system chip set for outputting a frequency multiplying factor and a second output connected with the frequency generator for outputting a frequency selection signal, thereby the frequency multiplying factor and the operating frequency of the computer motherboard can be changed according to the locked frequency data; and a decoder unit for receiving an address signal of the switched frequency input by the bus and decoding and confirming the address signal thereby to output a sequence signal for activating the storage unit.

In accordance with a further aspect of the present invention, the apparatus for switching an operating frequency of a computer motherboard further comprises an initial control unit arranged between the storage unit and the decoder unit and activated by a POWER GOOD signal. The initial control unit enables the storage unit to output a preset low frequency multiplying factor and low frequency selection signal so that the system is powered up at a lower speed.

In accordance with still a further aspect of the present invention, the apparatus for switching an operating frequency of a computer motherboard further comprises a reset unit activated by the sequence signal output by the decoder unit. The reset unit outputs a signal for the computer motherboard resetting its hardware.

Other objects, advantages and novel features of the invention will become more apparent from the following detailed description when taken in conjunction with the accompanying drawings.

DETAILED DESCRIPTION OF PREFERRED EMBODIMENT

Figure 1:
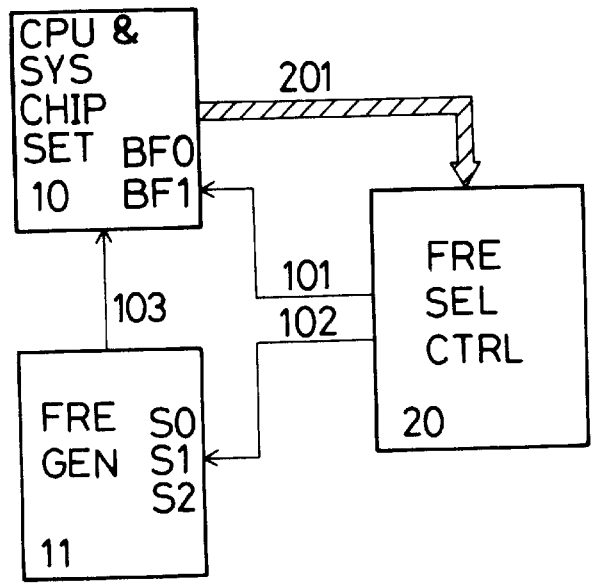
FIG. 1 is a schematic view showing a substantial structure of the apparatus in accordance with the present invention.
Figure 2:
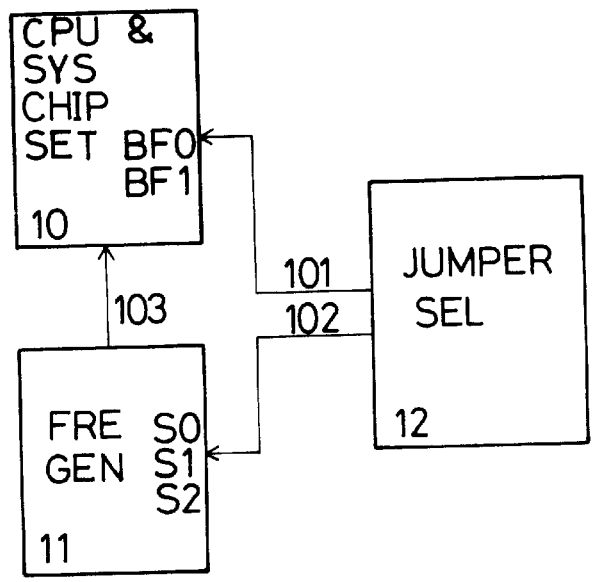
FIG. 2 is a block diagram showing a conventional apparatus for switching an operating frequency of a computer motherboard.

Referring to FIG. 1, the present invention uses a frequency selection controller 20, instead of a switch or jumper selector used in a conventional apparatus and method, to control a frequency multiplying factor 101 required for the CPU and system chip set 10 and a frequency selection signal 102 output to a frequency generator 11. Also, the frequency selection controller 20 controls the numerical states of the frequency multiplying factor 101 and the frequency selection signal 102 according to a signal of speed set value output by the CPU and system chip 10. Accordingly, it is easy and quick to set the frequency multiplying factor and operating frequency of the computer motherboard after inputting various speed setting signals 201 to a frequency selection controller 20 under the control of a program. In a preferred embodiment, this purpose is accomplished by means of setting the CPU frequency doubling factor and the outer operating frequency on a screen of the computer in a setting manner similar to that of the computer motherboard (BIOS) when the system is powered up. The above mentioned method avoids such steps as disassembling the computer, comparing with the handbook and adjusting the jumper, etc.

Figure 3:
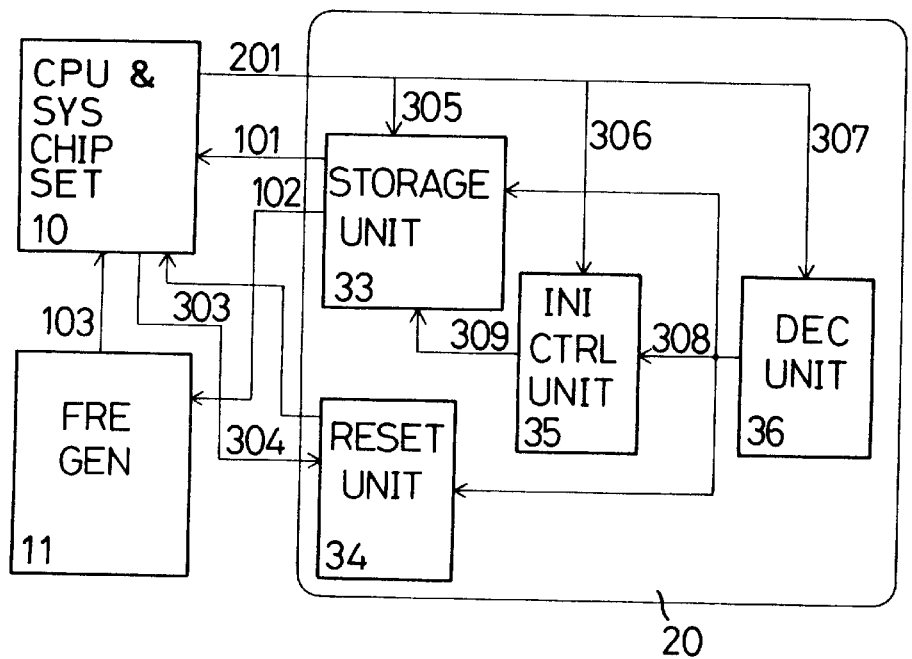
FIG. 3 is a block diagram showing an apparatus and method for switching an operating frequency of a computer motherboard in accordance with the present invention.
Figure 4:
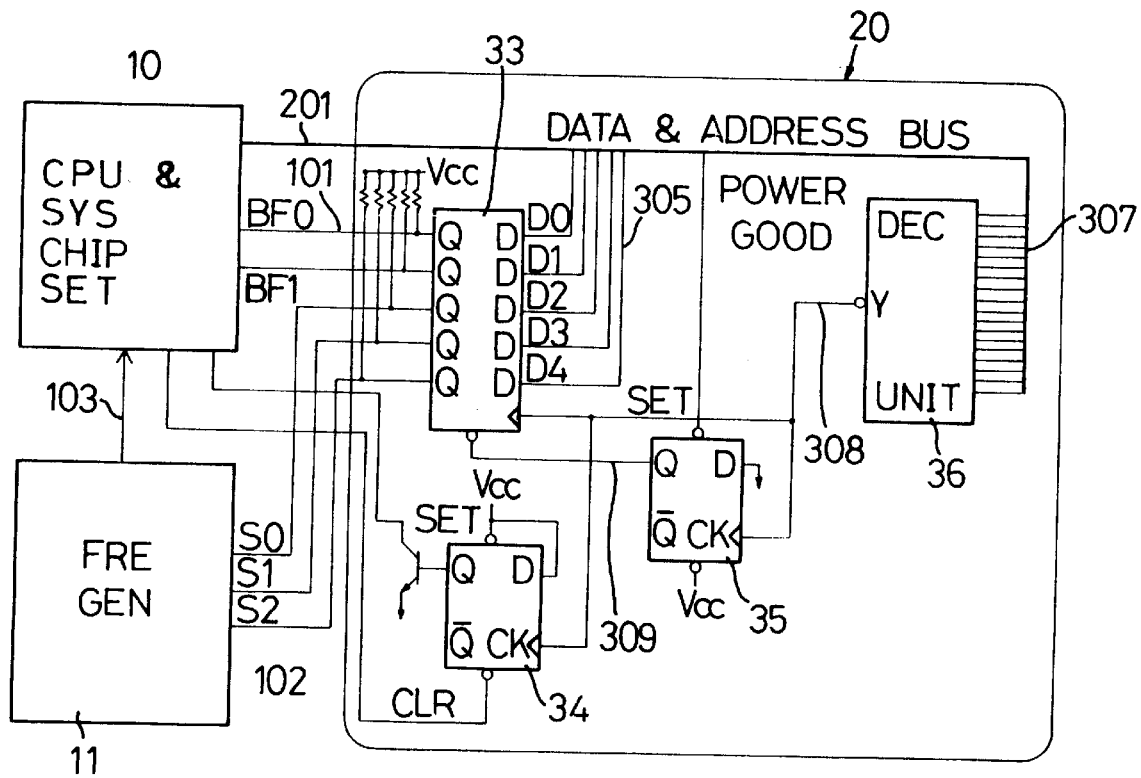
FIG. 4 is a circuit diagram of an preferred embodiment in accordance with the present invention.

In structure, referring to FIG. 3 and FIG. 4, it can be seen that the frequency selection controller 20 inside comprises a storage unit 33, a reset unit 34, an initial control unit 35 and a decoder unit 36. With this arrangement, the controller 20 can carry on the task of decoding and identifying the speed setting signal 201 output from the CPU and system chip, and of resetting the frequency multiplying factor and outer operating frequency. As shown in FIG. 4, the storage unit 33 may be a D-type flip-flop, the reset unit 34 and the initial control unit 35 also may be a D-type flip-flop, while the decoder unit 36 may be a decoder. When the CPU and system chip 10 convert the frequency after being powered up, the data/address bus will output a frequency signal 305 and a switch frequency address signal 307 to the storage unit 33 and the decoder unit 36, respectively. The initial control unit 35 receives a POWER GOOD signal output by a power supply of the computer. The decoder unit 36 outputs a trigger signal 308. Then the trigger signal 308 is coupled into the storage unit 33, the initial control unit 35 and the reset unit 34. The storage unit 33 further outputs above-mentioned frequency multiplying factor 101 to the CPU and system chip 10 and above-mentioned frequency selection signal 102 to the frequency generator 11. Additionally, the reset unit 34 outputs a resetting signal 303 provided for resetting the CPU and system chip 10, while the CPU and system chip 10 then outputs a resetting feedback signal 304 to the reset unit 34.

Figure 5:
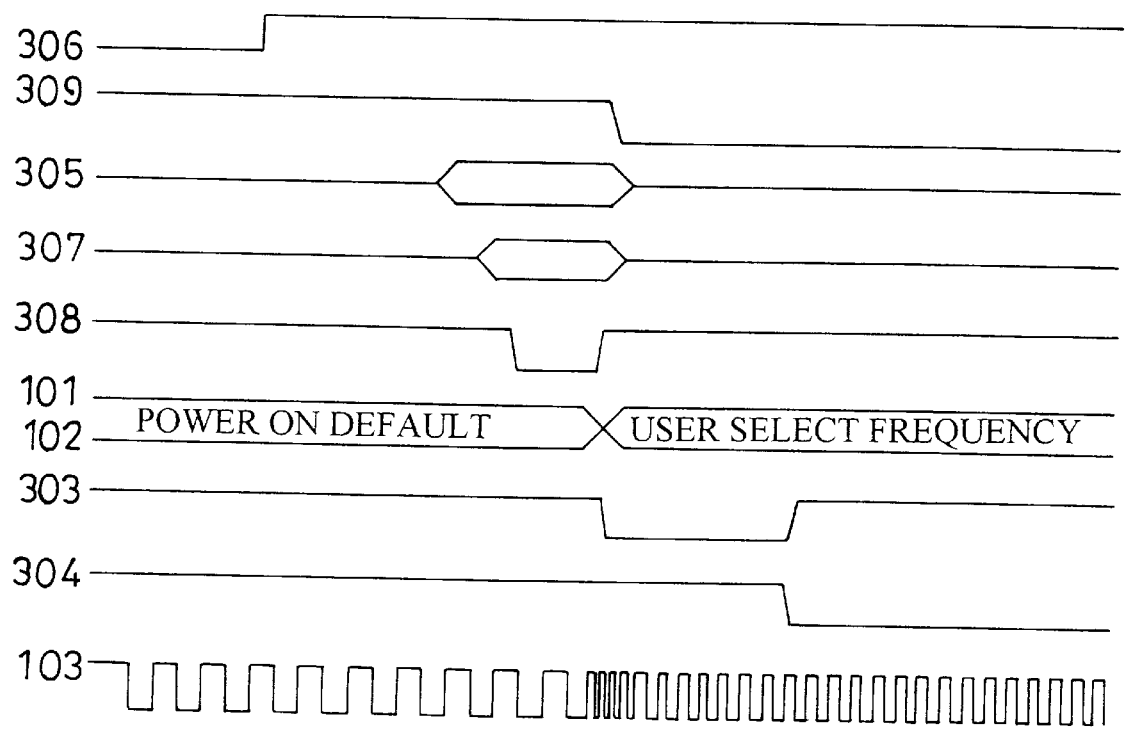
FIG. 5 is a sequence diagram showing the control signals of the apparatus and method in accordance with the present invention.

In operation, referring to FIG. 5, when the computer is powered up, the initial control unit 35 outputs an on-off signal 309 with high level (turn off) to the storage unit 33 after receiving an input POWER GOOD signal 306 (with high level) so that the storage unit 33 then outputs a lower frequency multiplying factor signal 101 to the CPU and system chip 10 and a lowerspeed frequency selection signal 102 to the frequency generator 11 to activate the computer motherboard at a lower speed. Thereby, an abnormal activation due to a high setting frequency can be avoided. After the frequency multiplying factor and the operating frequency of the computer motherboard is modified in the BIOS, the CPU will output the frequency data signal 305 and the switched frequency address signal 307. The switched frequency address signal 307 is sent into the decoder unit 36 to be decoded and identified. If the signal 307 is correct, the decoder unit 36 will output a trigger signal 308 (pulse of low level), which acts as a sequence signal for activating the storage unit 33, the reset unit 34 and the initial control unit 35. After being activated by the trigger signal 38, the initial control unit 35 outputs an on-off signal 309 which has been switched to low level (ON) to the storage unit 33 in order to latch the frequency data 305 which is to modify the operating frequency at an input of the storage unit 33, simultaneously, to enable the storage unit 33 to modify the output frequency multiplying factor signal 101 and frequency selection signal 102 according to the frequency data signal 305. Furthermore, the trigger signal 308 activates the reset unit 34 shown in FIG. 3 and FIG. 4 to enable the reset unit 34 to output a hardware resetting signal 303 of low level as shown in FIG. 5. Thereby, the CPU and system chip 10 resets the hardware, and then outputs a reset feedback signal 304 which has been switched from a high level to a low level to the reset unit 34 so as to clear the reset state and recover to its original state. After the resetting operation, the CPU and system chip operates according to the switched frequency multiplying factor and the outer operating frequency.

The above mentioned operation of switching the frequency is automatically followed by the operation of resetting the hardware for the purpose to avoid errors and failures which possibly occur due to the randomly switched operating frequency. Therefore, the operation of resetting the hardware assures the validity and stability of frequency switch.

Accordingly, the present invention provides an apparatus and method of selecting and modifying the CPU frequency multiplying factor and the system operating frequency by means of setting on the screen of the computer, instead of by changing or adjusting the jumper. Also, the present invention is controlled by program and the switching control circuit thereof is of full electronic design so that problems of oxidization and defect control can be avoided. Furthermore, the present invention is activated with power on default at a lower speed so that a problem where the computer can not be normally powered up at a higher setting frequency will be solved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A method for switching an operating frequency of a computer motherboard comprising the steps of:

setting a frequency multiplier factor and an operation frequency under a BIOS of said computer motherboard when said computer motherboard receives power;

outputting a frequency data signal consisting of said frequency multiplier factor and said operation frequency, said frequency data signal being transmitted by a data bus of said computer motherboard, and a switch frequency address signal to be decoded for latching said frequency data signal, wherein said switch frequency address signal is transmitted by an address bus of said computer motherboard;

decoding said switch frequency address signal; and latching said frequency data signal to provide said frequency multiplier factor to a CPU and chipset on said computer motherboard and to output a frequency selection signal to a frequency generator for providing an outer operating frequency in accordance with said operation frequency to said CPU and chipset.

2. A method for switching an operating frequency of a computer motherboard as claimed in claim 1 further comprising the step of activating said computer motherboard at a low speed by providing a low frequency multiplier factor and a low operation frequency to said CPU and chipset before said frequency multiplier factor and operation frequency are set.

3. A method for switching an operating frequency of a computer motherboard as claimed in claim 2, wherein said step of activating said computer motherboard is started by means of inputting a POWER GOOD signal.

4. A method for switching an operating frequency of a computer motherboard as claimed in claim 3, wherein said computer motherboard is switched to operate at an operating frequency according to said frequency multiplier factor and said operation frequency when said switch frequency address signal is decoded after said step of activating said computer motherboard.

5. A method for switching an operating frequency of a computer motherboard as claimed in claim 1, wherein said frequency data signal is latched by a register.

6. A method for switching an operating frequency of a computer motherboard as claimed in claim 1, wherein a trigger signal is generated after said switch frequency address signal is decoded to reset said computer motherboard so that said computer motherboard can switch to operate on an operating frequency according to said frequency multiplier factor and operation frequency.

7. An apparatus for switching an operating frequency of a computer motherboard using a frequency selection controller, said frequency selection controller comprising:

a storage unit for latching a frequency data signal consisting of a frequency multiplier factor and an operation frequency, where said frequency data signal is output from a CPU and chipset and transmitted by a data bus of said computer motherboard, said storage unit having a first output connected to said CPU and chipset for providing said frequency multiplier factor, and having a second output connected to a frequency generator to output a frequency selection signal to said frequency generator for providing an outer operating frequency in accordance with said operation frequency to said CPU and chipset, whereby said operating frequency of said computer motherboard can be switched according to said latched frequency multiplier factor and operation frequency; and a decoder unit for receiving a switch frequency address signal output from said CPU and chipset which is transmitted by an address bus of said computer motherboard, said decoder unit decoding said switch frequency address signal and outputting a trigger signal to activate said storage unit to latch said frequency multiplier factor and said operation frequency.

8. An apparatus for switching an operating frequency of a computer motherboard as claimed in claim 7, wherein said storage unit is a D-type flip-flop.

9. An apparatus for switching an operating frequency of a computer motherboard as claimed in claim 7, wherein said decoder unit is a decoder.

10. An apparatus for switching an operating frequency of a computer motherboard as claimed in claim 7 further comprising an initial control unit arranged between said storage unit and said decoder unit, said initial control unit being activated by a POWER GOOD signal from said computer motherboard, said initial control unit enabling said storage unit to output a low frequency multiplier factor and a low frequency selection signal so that said computer motherboard is powered up at a low speed before said frequency data signal and said switch frequency address signal are output from said CPU and chipset.

11. An apparatus for switching an operating frequency of a computer motherboard as claimed in claim 10, wherein said initial control unit is a D-type flip-flop.

12. An apparatus for switching an operating frequency of a computer motherboard as claimed in claim 10, wherein said storage unit latches said frequency multiplier factor and said operating frequency to enable said computer motherboard to operate according to said latched frequency multiplier factor and said operating frequency when said decoder unit transmits a trigger signal to said initial control unit.

13. An apparatus for switching an operating frequency of a computer motherboard as claimed in claim 7 further comprising a reset unit activated by for said trigger signal, said reset unit outputting a signal to reset said computer motherboard.

14. An apparatus for switching an operating frequency of a computer motherboard as claimed in claim 13, wherein said reset unit is a D-type flip-flop.

15. An apparatus for switching an operating frequency of a computer motherboard as claimed in claim 13, wherein said reset unit receives a reset feedback signal from said CPU and chipset to enable the reset unit to recover to its original state.

* * * * *